United States Patent [19]
Matsui

[11] Patent Number: 5,231,608
[45] Date of Patent: Jul. 27, 1993

[54] ULTRASONIC OBJECT DETECTING APPARATUS

[76] Inventor: Hiroo Matsui, 36-13-202, Ohsonedai, Kohoku-ku, Yokohama-shi, Japan

[21] Appl. No.: 717,489

[22] Filed: Jun. 19, 1991

[30] Foreign Application Priority Data

Jun. 29, 1990 [JP] Japan .................................. 2-173442

[51] Int. Cl.⁵ ............................................ G01S 15/00
[52] U.S. Cl. .................................... 367/93; 340/511
[58] Field of Search .................................. 367/93-94, 367/900; 340/554, 309.15, 511; 73/631, 599, 900; 342/205, 92

[56] References Cited

U.S. PATENT DOCUMENTS

| | | | |
|---|---|---|---|
| 3,740,704 | 6/1973 | Suter | 367/94 |
| 4,337,527 | 6/1982 | Delagrange et al. | 367/94 X |
| 4,542,489 | 9/1985 | Naruse | 367/93 |
| 4,852,576 | 8/1989 | Inbar et al. | 73/900 X |
| 5,047,752 | 9/1991 | Schorn | 367/93 X |

FOREIGN PATENT DOCUMENTS

135782 7/1985 Japan ..................................... 367/93

*Primary Examiner*—Thomas Mullen

[57] ABSTRACT

In an ultrasonic object detecting apparatus which detects the presence of an object by emitting ultrasonic tone bursts and by receiving the reflected wave, an attenuator is provided at the rear stage of a reception and amplification circuit and an attenuation control circuit for controlling the attenuation in the attenuation circuit is added so that the attenuation is increased at a timing when a reflected wave from a short distance object is received and the attenuation is decreased at a timing when a reflected wave from a long distance object is received. An object in a wide range from the short distance to the long distance may be thus stably detected.

1 Claim, 6 Drawing Sheets

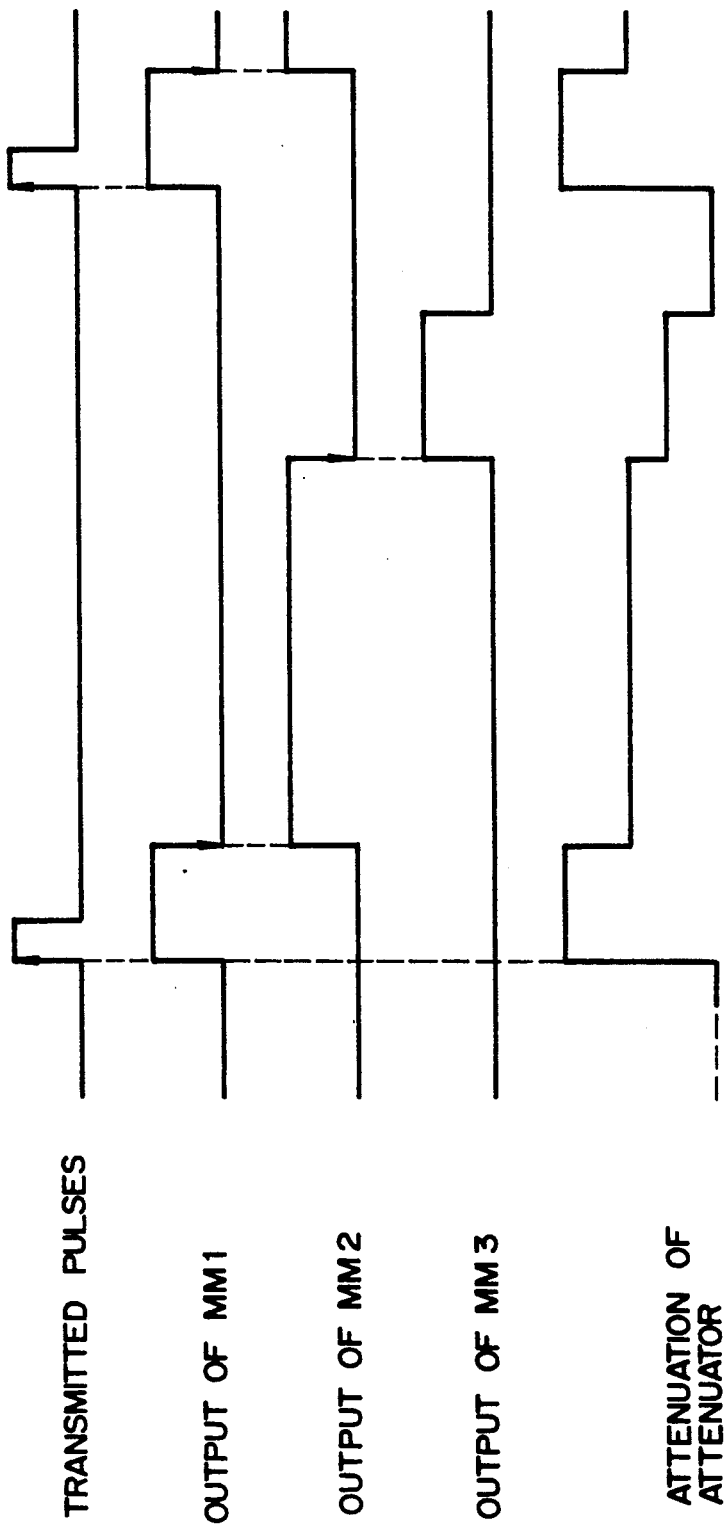

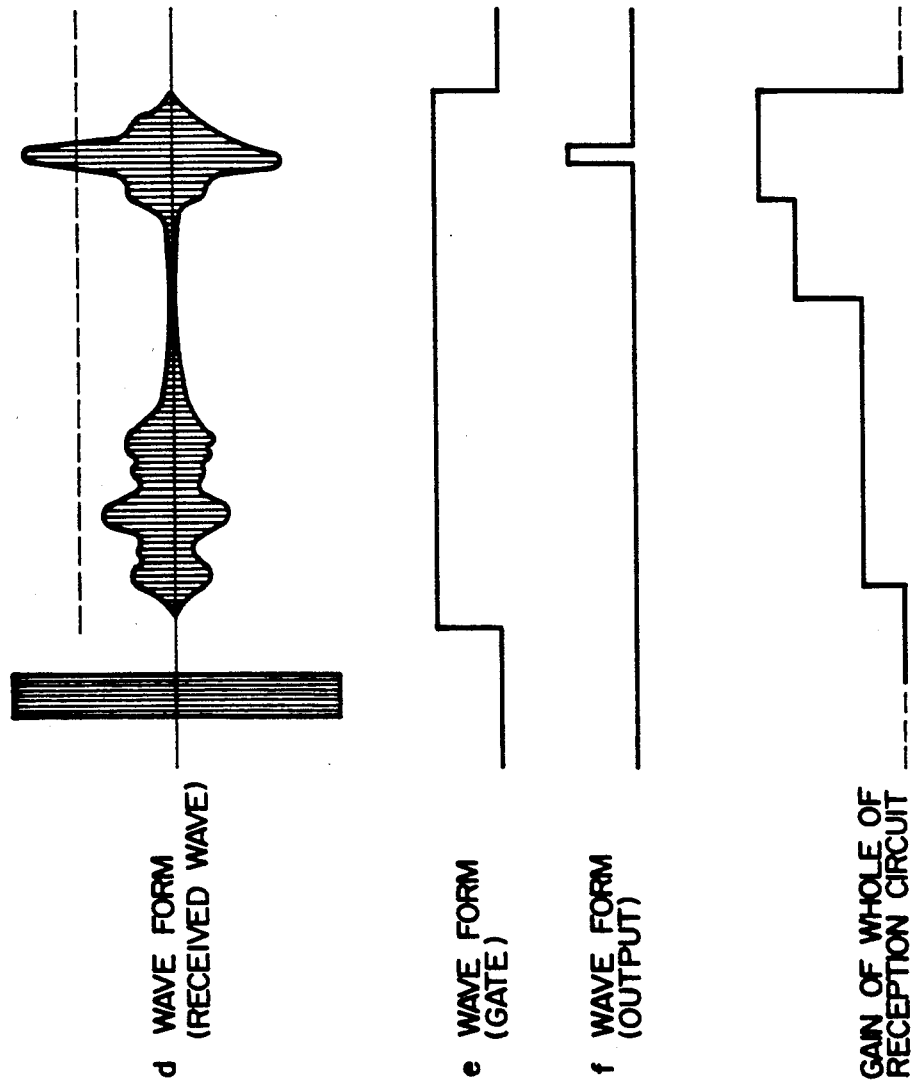

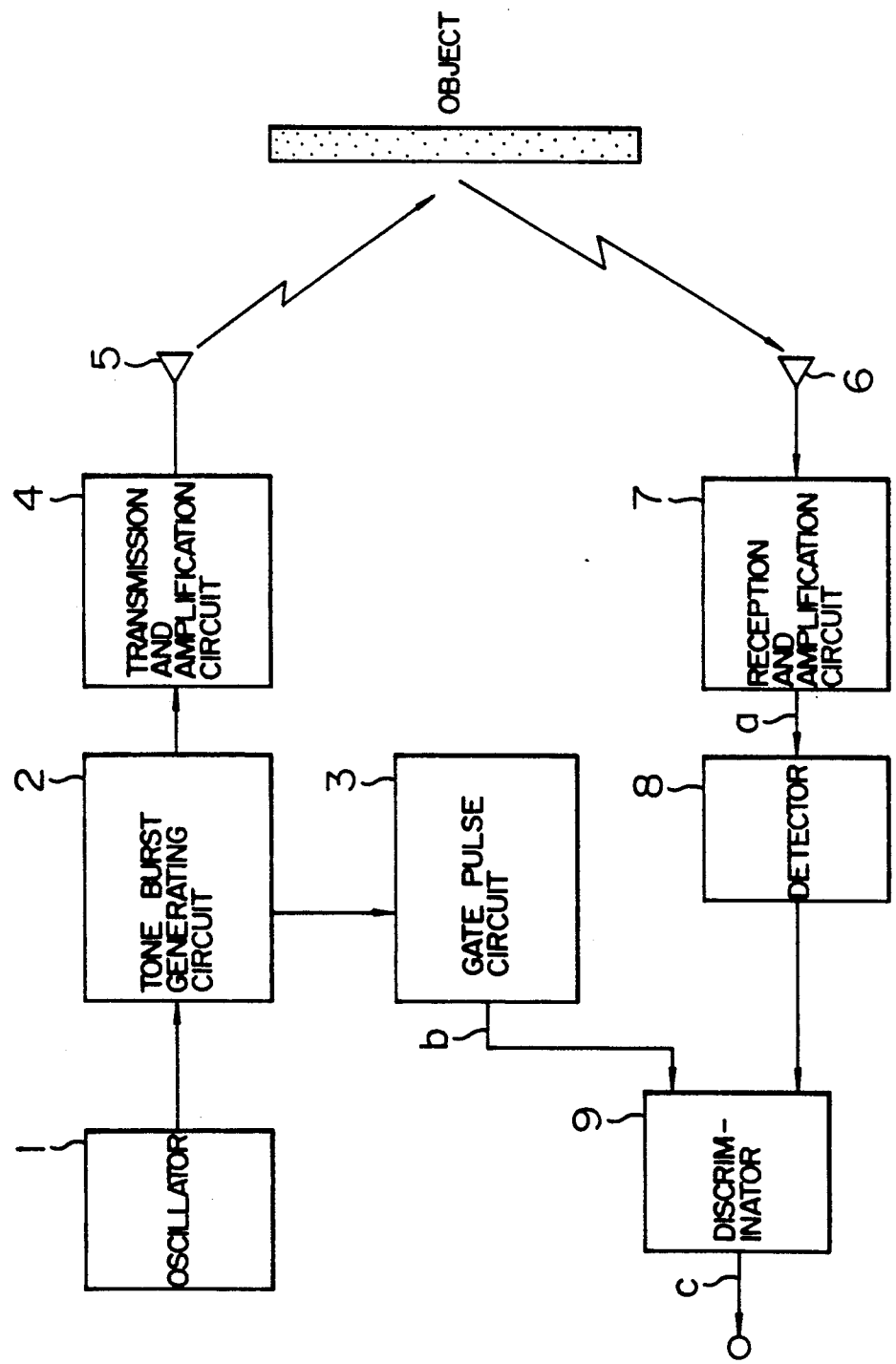

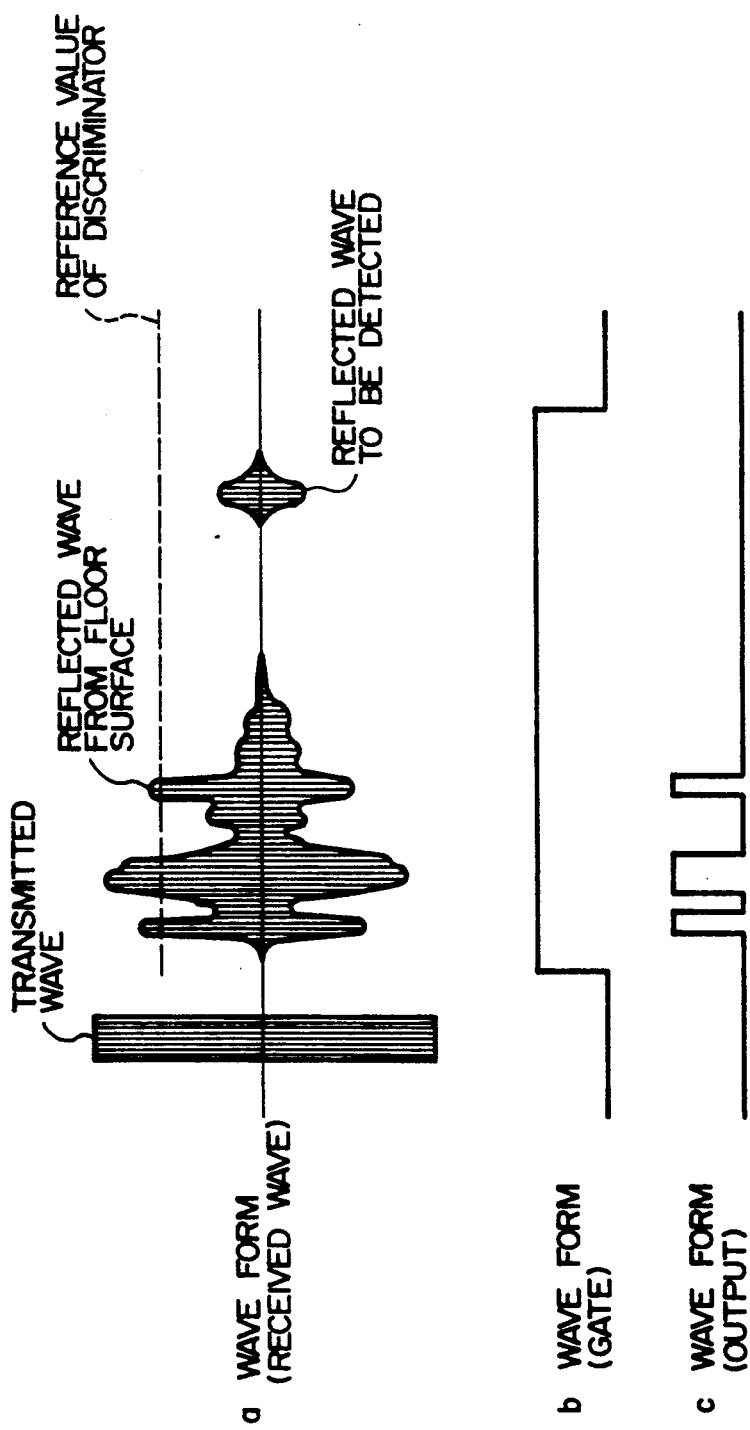

ULTRASONIC OBJECT DETECTING APPARATUS

BACKGROUND OF THE INVENTION

1. Field of the Invention

The present invention relates to an ultrasonic object detecting apparatus for detecting the presence of a human body, vehicle and the like by using the reflection of ultrasonic waves.

2. Description of the Related Art

FIG. 5 shows a block diagram of a conventional ultrasonic object detecting apparatus. In FIG. 5, an oscillator 1 is connected with a tone burst generating circuit 2 and a gate pulse circuit 3. The tone burst generating circuit 2 is connected with an ultrasonic wave transmitter 5 via a transmission and amplification circuit 4 for forming a transmission circuit. Similarly, an ultrasonic wave sensor 6, a reception and amplification circuit 7, a detector 8 and a discriminator 9 are coupled with each other as shown in the drawing for forming a reception circuit.

Reference timing signals are generated by the oscillator 1 and radio frequency pulses each having a width of about 10 ms are generated at intervals of usually 200 ms by the tone burst generating circuit 2 and ultrasonic wave pulses are emitted from the ultrasonic wave transmitter 5 via the transmission and amplification circuit 4. If an object exists in front of the ultrasonic wave transmitter 5, a wave reflected from the object is received and amplified by the ultrasonic wave sensor 6 and the reception and amplification circuit 7 and is converted into a direct current level by the detector 8. When the reflected wave, which has been converted into the direct current level by the detector 8, is received within a period of the gate pulse outputted by the gate pulse circuit 3, which generates gate pulses representative of a period of time during which the reflected wave which is shifted by a given real period of time from the pulses generated by the tone burst generating circuit 2 may be detected, a detection signal is outputted by the discriminator 9.

However, the conventional art having such a structure has a drawback as follows. Since the level of the reflected wave detected by the ultrasonic object detecting apparatus changes greatly due to the difference in distance between the object and the ultrasonic object detecting apparatus as shown in FIG. 6a, it is necessary to increase the gain of the reception and amplification circuit 7 so that an object which is far from the detecting apparatus can be detected. If the gain is excessively increased, the level of the reflected wave from the surface of a close floor or a wall which is located out of a detecting area would be increased. Thus only the reflected wave from the floor surface is detected as shown in FIG. 6c during the gate period as shown in FIG. 6b, and misdetection takes place. Accordingly, it is difficult to stably detect the presence of an object over a continuous range from a short distance such as several centimeters to a long distance such as about ten meters.

SUMMARY OF THE INVENTION

The present invention aims at eliminating the above-mentioned drawback of the prior art. It is an object of the present invention to provide an ultrasonic object detecting apparatus which is capable of stably detecting an object over a wide range from a short distance to a long distance.

In order to accomplish the above-mentioned object in accordance with the present invention, an attenuator is provided at the rear stage of a reception and amplification circuit and an attenuation control circuit for controlling the attenuation in the attenuation circuit is added so that the attenuation is increased at a timing when a reflected wave from a short distance object is received and the attenuation is decreased at a timing when a reflected wave from a long distance object is received. An object in a wide range from the short distance to the long distance may be thus stably detected.

Therefore, randomly reflected waves from the surface of a short distant floor or wall which is located outside of a detecting area may be rejected by increasing the attenuation of the attenuator provided at the rear stage of the reception and amplification circuit since the level of the randomly reflected wave is lower than that of the reflected wave from an object which is located in the detecting area. On the other hand, the reflected wave from a long distance object can be positively detected by decreasing the attenuation. A detection limit can be thus extended.

BRIEF DESCRIPTION OF THE DRAWINGS

FIG. 3 is a timing chart showing the timing relation in the attenuation control circuit;

FIG. 4 is a view showing the wave forms in the present embodiment;

FIG. 5 is a block diagram showing an prior art; and

FIG. 6 is a view showing the wave forms in the prior art.

DESCRIPTION OF THE PREFERRED EMBODIMENT

Figure 1:
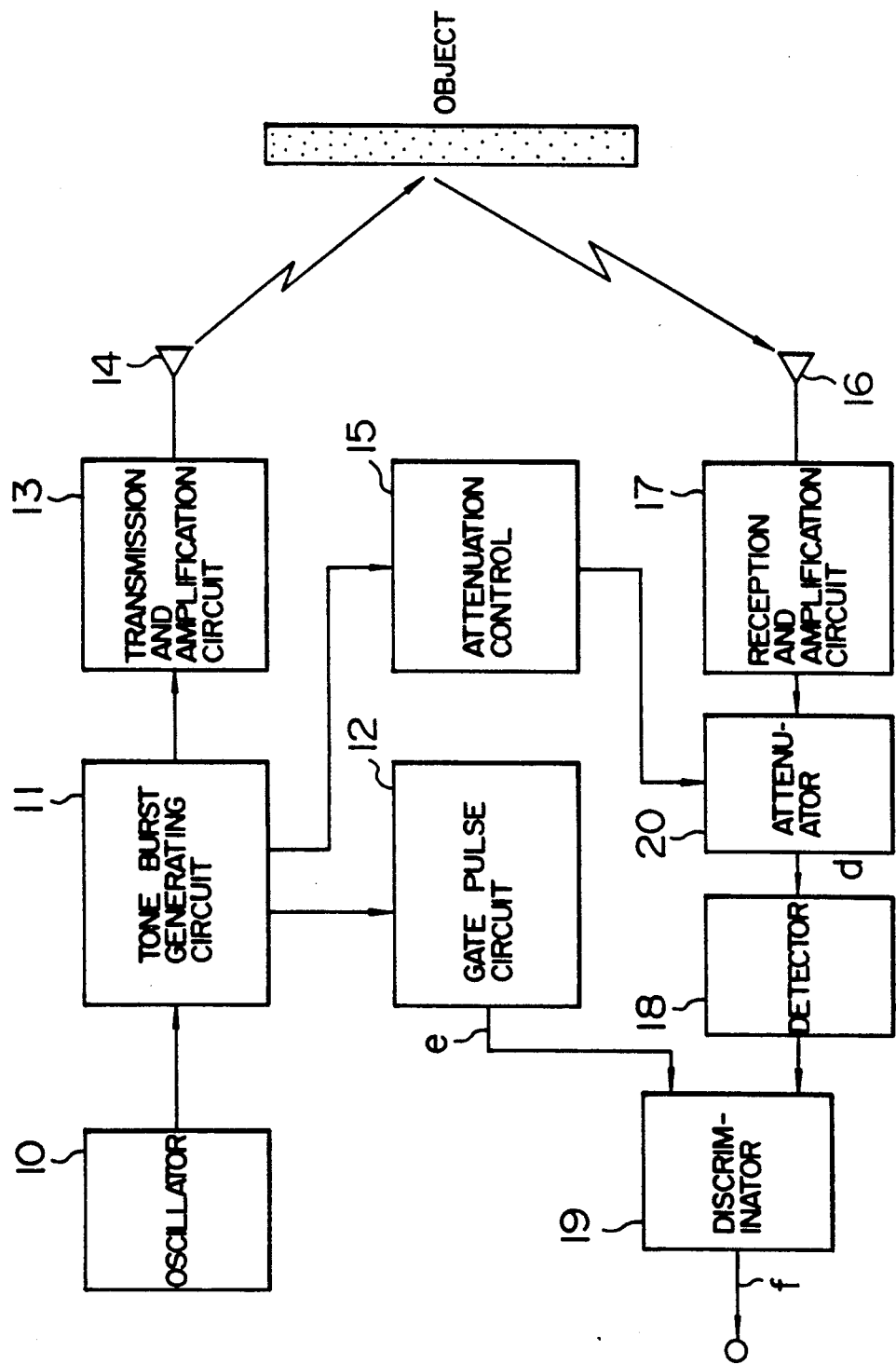
FIG. 1 is a block diagram of an embodiment of an ultrasonic object detecting apparatus of the present invention.

FIG. 1 shows an embodiment of the present invention. In FIG. 1, a reference numeral 10 denotes an oscillator, 11 a tone burst generating circuit, 12 a gate pulse circuit, 13 a transmission and amplification circuit, 14 an ultrasonic wave transmitter, 15 an attenuation control circuit, 18 a detector, 19 a discriminator and 20 an attenuator.

Now, operation of the present embodiment will be described.

In FIG. 1, an oscillator 10 is connected with a tone burst generating circuit 11, a gate pulse circuit 12 and an attenuation control circuit 15. The oscillator 10 is connected with an ultrasonic wave transmitter 14 via the tone burst generating circuit 11 and a transmission and amplification circuit 13 for forming a transmission circuit. Similarly, an ultrasonic wave sensor 16, a reception and amplification circuit 17, the attenuation control circuit 15, the detector 18, the discriminator 19 and the attenuator 20 are connected as shown in the drawing for forming an ultrasonic wave reception circuit. The attenuation control circuit 15, which is a feature of the present embodiment, is connected with the one burst generating circuit 11 and the attenuator 20 as shown in FIG. 1.

Figure 2:
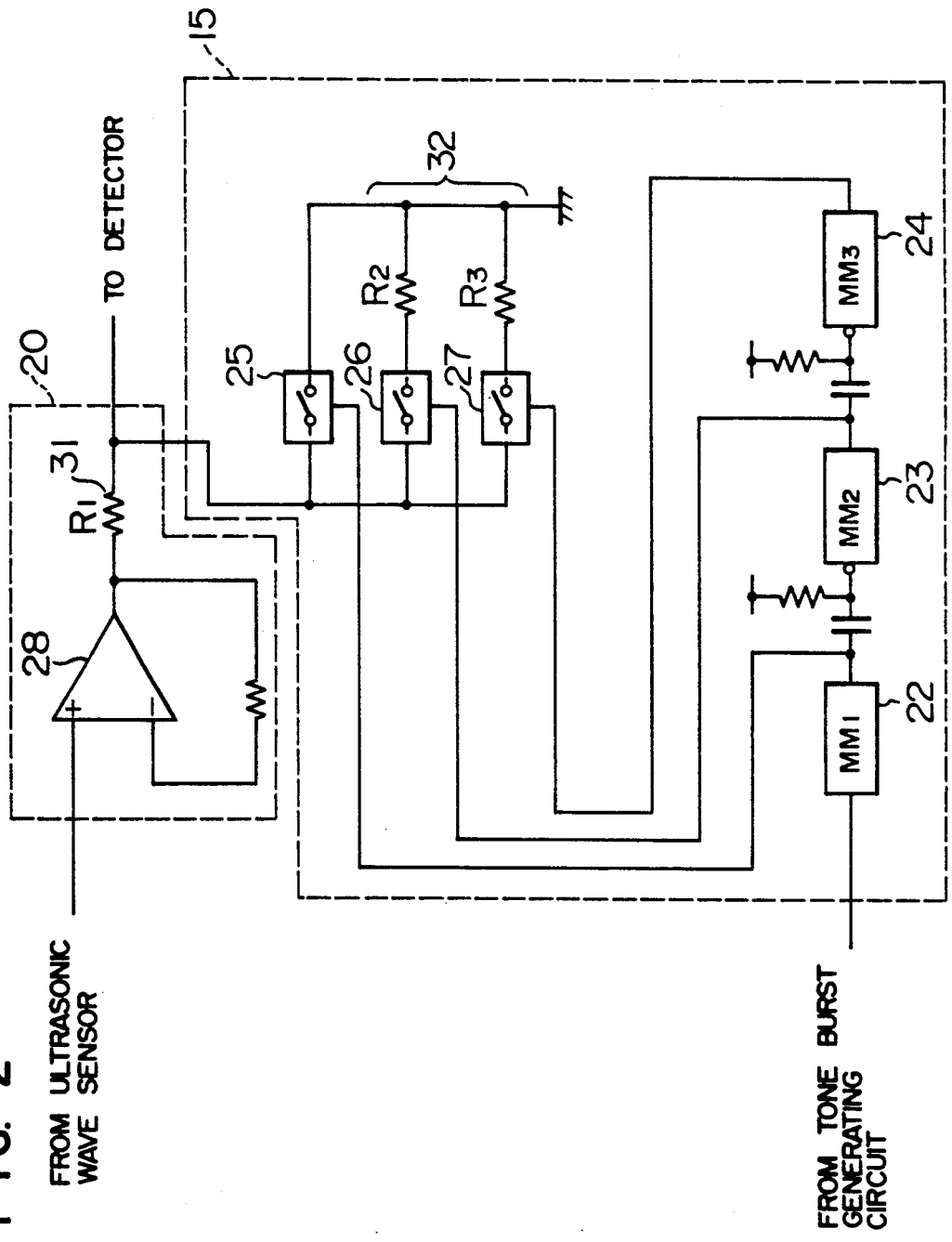
FIG. 2 is a circuit diagram showing an attenuation control circuit in the present embodiment.

FIG. 2 shows an example of the attenuation control circuit 15 and the attenuator 20. In FIG. 2, a reference numeral 28 denotes an operational amplifier; 31 and 32 invariable resistors; 22, 23 and 24 monostable multivibrators and 25, 26 and 27 analog switches. The attenuation control circuit 15 comprises analog switches 25, 26 and 27 which switch a plurality of invariable resistors 31, 32 for dividing the output voltage of the operational amplifier 28 and monostable multivibrators 22, 23 and 24 for setting the switching timing of the switches, which are connected as shown in FIG. 2. The attenuation switching timing is set by the monostable multivibrators 22, 23 and 24 in response to the ultrasonic wave emission timing pulses generated by the tone burst generating circuit 11. The outputs of the monostable multivibrators 22, 23 and 24 are coupled with the switching terminals of the analog switches 25, 26 and 27, respectively for controlling the analog switches 25, 26 and 27 to turn on or off. The analog switches 25, 26 and 27 are connected between the ground (0V) and the invariable resistors 31 and 32 for dividing the output voltage of the operational amplifier 28 so that the attenuation of the attenuator provided at the rear stage of the operational amplifier 28 is controlled by switching the plurality of voltage dividing invariable resistors 32 in response to the turning on or off of the analog switches.

In the present embodiment, the attenuation is switched in four steps as shown in FIG. 3. When an ultrasonic wave emission timing pulse is inputted into the monostable multivibrator 22, a pulse having a given width is outputted from the multivibrator 22. The pulse is inputted into the switching terminal of the analog switch 25. While the pulse is inputted from the monostable multivibrator 22, the analog switch 25 is turned on. The output terminal of the monostable multivibrator 23 is provided to monostable multivibrator 23 via a differential circuit. The monostable multivibrator 23 is triggered to output a pulse having a given width at the time when the output of the monostable multivibrator 22 falls. The pulse is inputted to the switching terminal of the analog switch 26. The analog switch 26 is turned on while the pulse from the monostable multivibrator 23 is inputted thereto. The monostable multivibrator 24 and the analog switch 27 are similarly operated.

The attenuation when the analog switch 25 is turned on is $\infty$. The attenuation when the analog switch 26 is turned on is $R_2/(R_1+R_2)$. The attenuation when the analog switch 27 is turned on is $R_3/(R_1+R_3)$. The attenuation when all the analog switches are turned on is 0. Therefore, if $R_1$, $R_2$ and $R_3$ are assumed as 10 k$\Omega$, $\infty$, $-6$ dB, $-3.5$ dB and 0 dB. By presetting the pulse widths of the three monostable multivibrators 22, 23 and 24 and the resistances of invariable resistors 31 and 32 to suitable values in such a manner, attenuation control can be performed so that the attenuation of the attenuator 20 provided at the rear stage of the reception and amplification circuit 17 is decreased with the lapse of time after the transmission of an ultrasonic pulse.

The attenuation of the attenuator 20 at the rear stage of the reception and amplification circuit 17 is variable as is similar to the above-mentioned embodiment. By increasing the attenuation of the attenuator 20 provided at the rear stage of the reception and amplification circuit 7 just after the transmission of the ultrasonic pulse, that is, when the detection distance is close, the influence of random reflection from the floor surface is reduced as shown in FIG. 4 to prevent misdetection from occurring. By stepwise or continuously decreasing the attenuation of the attenuator provided at the rear stage of the reception and amplification circuit 7 since the transmission of the ultrasonic pulse, the detection rate of an object which is located at a long distance can be increased and stable detection performance can be continuously assured over a wide range from a short distance to a long distance. The present invention has the above mentioned effects.

The present invention provides the apparatus which has been described and the effects are obtained as follows. Particular, an ultrasonic object detecting apparatus is provided which has a very high performance in that misdetection due to random reflection on the short distance floor and the like is prevented and the detection performance at a long distance can be stably assured by lowering the attenuation of the attenuator provided at the rear stage of the reception and amplification circuit with the lapse of time since the transmission of the ultrasonic pulse.

I claim:

1. An ultrasonic object detecting apparatus comprising:

a transmitter for transmitting ultrasonic tone bursts at a given cycle;

a receiver for detecting the presence of an object by receiving a reflected wave of the ultrasonic tone bursts from the object to be detected;

an attenuator for attenuating the output of said receiver; and an attenuation control circuit for sequentially decreasing a degree of attenuation by said attenuator in accordance with a lapse of time after transmission of said ultrasonic tone bursts, wherein said attenuator comprises an operational amplifier receiving said output of said receiver and a first fixed resistor connected to an output terminal of said operational amplifier, and said attenuation control circuit comprises (i) an analog switch means including a first analog switch, a second analog switch and a third analog switch, (ii) a second fixed resistor connected between said analog switch and ground and (iii) a third fixed resistor connected between said third analog switch and ground, said first analog switch being connected between said first fixed resistor and ground, such that by controlling on/off timing of said first, second and third analog switches, said degree of attenuation is controlled and an output of said first fixed resistor constitutes an attenuated output of said attenuator.

* * * * *

UNITED STATES PATENT AND TRADEMARK OFFICE
CERTIFICATE OF CORRECTION

PATENT NO. : 5,231,608
DATED : July 27, 1993
INVENTOR(S) : Hiroo MATSUI

It is certified that error appears in the above-indentified patent and that said Letters Patent is hereby corrected as shown below:

On the title page, insert --[73] Matsushita Electric Industrial Co., Ltd., Osaka, Japan--.

Signed and Sealed this

Twenty-ninth Day of March, 1994

Attest:

BRUCE LEHMAN

*Attesting Officer*      *Commissioner of Patents and Trademarks*